Patented June 6, 1950

2,510,937

UNITED STATES PATENT OFFICE 2,510,937

ALKYLATION OF AROMATIC COMPOUNDS IN LIQUID CATALYST SOLUTIONS

Harco Jacob Tadema, Amsterdam, Netherlands, assignor to Shell Development Company, San Francisco, Calif., a corporation of Delaware No Drawing. Application May 27, 1947, Serial No. 750,868. In the Netherlands June 4, 1946

6 Claims. (Cl. 260—521)

1

This invention relates to a method of alkylating aromatic compounds in solutions of liquid catalysts. It particularly relates to a novel alkylation process in which a liquid catalyst forms a substantially homogeneous reaction medium wherein the aromatic compound is contacted with the alkylating agent. In its most specific embodiment the invention provides a process for the production of oil soluble alkylation-polymerization products capable of combining with and rendering oil-soluble substantial amounts of metal ions, which process comprises contacting certain polar aromatic compounds with alkylating agents in a substantially homogeneous liquid phase reaction medium consisting essentially of a liquid catalyst.

While a wide variety of catalytic alkylation processes suitable for the laboratory production of alkylated aromatic compounds are known, such processes have been severely restricted in commercial applications because of the difficulties encountered in similarly adapting the substances commonly employed as catalysts to reactions on a large scale. The substances commonly employed as alkylation catalysts include, strong inorganic acids such as sulfuric or phosphoric acids, gases such as boron trifluoride, and solids or in some cases molten mixtures of one or more of the numerous substances known as Friedel-Crafts type catalysts. In general, unless it was desired to produce an almost solid mixture composed mainly of a polymerized unsaturated alkylating agent, the catalysts were employed in what was termed "catalytic amounts," i. e., the catalysts were employed in considerably less than equal portions by weight with the compound to be alkylated since each mole of an alkylation catalyst usually brings about the attachment to the aromatic nucleus the alkyl residues of several moles of the alkylating agent. Particularly when the higher homologues of the aromatic compound and the alkylating agent were employed in more or less impure mixtures, in addition to the problem of obtaining intimate contact with and separating the catalysts from large quantities of reactants, the large scale alkylation processes catalyzed in the usual manner have been characterized by numerous disadvantages. The inorganic acids required relatively high reaction temperatures, which, when compounds other than the lowest homologues were employed, tended to cause a considerable decomposition of the organic reactants. The gaseous catalysts were extremely difficult to recover for reuse and in large scale operations were required in amounts which rendered the process relatively expensive. The Friedel-Crafts type catalysts were usually active in the form of a brown sludge-like suspension of complex organo metallic addition compounds which were extremely hard to remove from the reaction products. While methods of avoiding this sludge formation have been proposed, such as the employment of the Friedel-Crafts type catalytic material dissolved in a nitroparaffin, the problem of purifying the reaction products still remains, and since it is often necessary to steam distill the alkylated products away from the catalyst-containing solution, such reactions are not applicable to polar aromatic compounds in general, as many polar aromatic compounds are not steam-volatile.

An important object of the present invention is to provide a relatively low temperature alkylation process in which the catalyst forms substantially no sludge-like suspensions of addition compounds in the reaction mixture. Another object of the invention is to provide a catalytic alkylation process which is applicable to aromatic compounds containing one or more carboxyl or hydroxyl groups and which does not depend upon the steam volatility of the alkylated products to free them of the catalyst. A further object of the invention is to provide a method of economically producing mixtures of alkylated polar aromatic compounds and polymerized olefins capable of combining with and rendering oil-soluble substantial amounts of metal ions to form improved lubricating oil additives. Still other objects and advantages of the present process will be apparent from the following description.

It has now been discovered that by bringing aromatic compounds, alkylating agents, and catalytic agents together in a homogeneous liquid solution in which an alkylation catalyst in its liquid state serves as a solvent for said compounds and agents, reaction products are produced which have an entirely different character than those it has heretofore been possible to attain. For example, when an aromatic compound such as, phenol is dissolved in a liquid alkylating catalyst employed in solvent proportions, as in nine parts by weight of molten antimony trichloride, for example, the addition of an excess of an alkylating agent, a mixture of olefines of from five to eight carbon atoms per molecule, for example, produces compounds which entirely consists of alkylated phenyl ethers. On the other hand when phenol is contacted with an excess of an olefin in the presence of boron trifluoride in the quantities usually employed, the compounds produced primarily consist of alkylated phenols and contain only minor amounts of phenyl ethers. Similarly, when salicylic acid is dissolved in six parts of molten antimony trichloride, and treated with an excess of cetene at about 90° C. alkylation-polymerization products are produced in greater than 80% conversions from which the catalyst and the unconverted reactants may be readily recovered and reused. On the other hand, when salicylic acid is similarly alkylated in the presence of the usual Friedel-Crafts type catalysts, such as aluminum trichloride in the amounts usually employed, the separation of the catalyst addition compounds from the non steam volatile reactants and reaction products is extremely difficult, and less than a 20% conversion to alkylated carboxylic compounds is obtained.

The present invention provides a novel process for the catalytic alkylation of aromatic compounds which comprises contacting the aromatic compound with the alkylating agent under alkylating conditions in a substantially homogeneous reaction medium in which the catalyst is present in sufficient proportions to dissolve substantially all of the aromatic compound, and which reaction medium essentially consists of the aromatic compound and one or more of the trihalides of phosphorous, arsenic, or antimony.

The trichlorides of arsenic, phosphorus and antimony form a preferred sub-group of liquid catalysts when employed as described in the present process because of their operability over a wide range of alkylating conditions. The most particularly preferable catalyst is antimony trichloride employed in amounts which are usually greater than about 3.5 parts by weight of catalyst to one part by weight of the aromatic compound and at temperatures above about 50° C. While certain aromatic compounds may be somewhat soluble in lesser amounts of antimony trichloride, it has been found that the employment of antimony trichloride in weight proportions of substantially less than 3.5 times the weight of aromatic compound particularly at temperatures below the melting temperature of the resulting mixture, i. e., as the equivalent of aluminum chloride in the usual Friedel-Crafts type catalytic alkylation procedures, results in a low rate of alkylation reaction and therefore unless excessively high temperatures, pressures, or periods of reaction are employed such a procedure is productive of only minor conversions of the starting material.

The present process is particularly suitable for the alkylation of polar aromatic compounds containing substituent groups such as the hydroxyl or carboxyl groups in which one or a plurality of hydroxyl and/or carboxyl groups are attached to a single aromatic nucleus and by the present process even the non-steam volatile compounds may be readily freed of inorganic impurities. In the case of compounds containing substituent hydroxyl groups in the absence of carboxyl groups, i. e., phenols, alkylation products can be obtained by the present process which differ markedly from the products of an alkylation reaction as heretofore practiced upon similar polar aromatic compounds. For example, phenol, by allowing an alkylation reaction in accordance with the present process to go to completion, can be entirely converted by an olefin to alkylated phenyl ethers so that the alkylation products form no color with ferric chloride. On the other hand, Nieuwland et al., J. A. C. S. 54,3694 (1932) reported the formation of only a minor amount of the phenyl ether in the presence of large amounts of alkylated phenols when the condensation of a phenol and an olefin was allowed to go to completion in the presence of boron trifluoride. It is therefore apparent that the present process unexpectedly produces a more complete substitution of alkyl groups for the replaceable hydrogen atoms or that when employed in accordance with the present process these particular alkylation catalysts, while they are metal halides similar to the metal halides falling within the general Friedel-Crafts type catalyst classification, do not cause the rearrangement of alkyl groups attached to the oxygen atom to the extent usually occurring in the presence of a Friedel-Crafts type catalyst under alkylating conditions.

Illustrative examples of aromatic compounds containing carboxyl and/or hydroxyl groups and which are particularly preferred materials for alkylation in accordance with the process of the invention since their alkylation products are particularly valuable intermediates for the preparation of lubricating oil additives include, salicylic acid, phenol, 4-hydroxy-benzoic acid, o-, m-, and p-cresols, benzoic acid, 2,3-dihydroxybenzoic acid, 2,4-dihydroxybenzoic acid, 2,5-dihydrophenyl-acetic acid, beta-phenylpropionic acid, n-phenylbutyric acid, beta-naphthoic acids, phthalic acid, xylidinic acids, cumideric acids, 4-hydroxyl-1,-3-dicarboxybenzene, resorcinol, catechol, oxyphenols, 2,6-dihydroxybenzoic acid, 3,4-dihydroxybenzoic acid, 3,5-dihydroxybenzoic acid, 2,3-dimethylbenzoic acid, 2,4-dimethylbenzoic acid, 2,5-dimethylbenzoic acid, 2,6-dimethylbenzoic acid, 3,4-dimethylbenzoic acid, 3,5-dimethylbenzoic acid, o-, m- and p-ethylbenzoic acids, m-hydroxybenzoic acid, o- and p-isopropylbenzoic acids, o-, m-, p-methylbenzoic acids, o-, m- and p-phenylbenzoic acids, o- and p-propylbenzoic acids, o-, m- and p-propylphenols, o-, m- and p-phenylphenols, o-, m- and p-methylphenols, o-, m- and p-ethylphenols, and their homologues and analogues.

Other "alkylatable" aromatic compounds which may suitably be alkylated by the present process include any mono or polynuclear aromatic compounds containing one or more hydrogen atoms which are sufficiently active as to be replaced by the alkyl residue of an alkylating agent under the normal alkylating conditions such as, naphthalene, the mono- or polycycloalkylbenzenes, the mono- or polyalkylarylbenzenes, the mono- or polycycloalkylarylbenzenes, the mono- or polyalkylnaphthalenes, the mono- and polyarylnaphthalenes, the mono- or polycycloalkylnaphthalenes, the mono- or polyalkylarylnaphthalenes, the mono- or polycycloalkylarylnaphthalenes, the anthracenes, the alkyl phenyl ethers, the alkoxybenzenes, and their homologues and analogues.

Any of the numerous types of compounds commonly employed as alkylating agents for the catalytic alkylation of aromatic compounds are suitable for the present process. They may be employed as the individual substances or components of mixtures or solutions, or may be formed in situ during the alkylating operation by the reaction of suitable materials under the alkylating conditions employed in the process.

Compounds or mixtures rich in compounds containing olefinic linkages between two or more carbon atoms which are not members of a ring system and which have boiling points above about 50° C. under atmospheric pressure form the preferred alkylating agents for employment in accordance with the present process. Illustrative examples of this preferred sub-class of alkylating agents include such particular compounds and mixtures of olefines such as the hexylenes, decylenes and cetenes, cyclo-olefins such as cyclohexylene, olefin-containing mixtures such as the vapor or liquid-phase cracking products of paraffin waxes having a boiling range above about 50° C., olefinic alcohols such as allyl, crotyl, and cinnamic alcohols, olefinic carboxylic acids such as maleic, oleic and linoleic, unsaturated aldehydes such as acrolein or crotonaldehyde, unsaturated esters such as those contained in rape-seed oil or soya bean oil, and their homologues and analogues which have boiling points above about 50° C.

The most particularly preferable alkylating agents are compounds containing one or more olefinic linkages which are normally liquids boiling substantially above room temperature, i. e., compounds of the general formula $C_nH_{2n-y}$ in which $n$ is an integer greater than 6 and $y$ is zero or the integers 2 or 4. The particularly preferable alkylating agents include such individual representative compounds as hexene, cyclohexene, heptene, octylene, decylene, hexadecylene, octadecylene, treacontene, hexadiene, heptadiene, as individual substances or as the primary components of mixtures such as the vapor or liquid phase cracking distillates of paraffin wax, and the like.

In many cases the present alkylation process is rapid and productive of high yields of alkylated materials when trihalides of arsenic phosphorus or antimony are employed in the liquid state and in the substantial absence of any catalyst-activator or promoter. This is true even in the case of alkylating polar carboxyl and hydroxyl substituted aromatic compounds with relatively high-boiling olefins. However, the rate of the alkylation reaction may be increased by the employment of a catalyst activator such as ferric chloride, hydrochloric acid or water, which may be combined with and introduced into the alkylation reaction with the liquefied catalyst, or in the case of vaporous activators, may be continuously introduced into the liquid reaction medium during the alkylation reaction, preferably following the addition of the alkylating agent.

The employment of antimony trichloride in accordance with the process of the invention, avoids the formation of the sludge-like complex organo metallic addition compounds which are characteristic of alkylation reactions employing Friedel-Crafts type catalysts, particularly aluminum chloride, in the usual alkylation procedures. Moreover, the antimony chloride may be readily recovered and by virtue of its ease of dehydration, can be economically restored to the anhydrous state for whatever reuse is desired. For example, after the alkylation reaction is complete, the solution of the reaction products is allowed to cool to a temperature approaching the solidfying temperature of the antimony trichloride. A two-phase or three phase system is thereby formed in which the lower layer consists essentially of liquid, or in some cases solid and liquid antimony trichloride, which may be separated by a simple decantation of the mixture and reused in further alkylation reactions. The small quantity of antimony trichloride which remains in the organic layer may likewise be readily recovered, for instance by the addition of a substantial quantity of a non-ionic organic solvent such as a gasoline fraction, ethers, hydrocarbons, or the like, and the subsequent separation of the second mixture of immiscible liquid solutions. Obviously, the addition of the non-ionic solvent may precede the cooling of the reaction mixture, or still other variations of the separation procedure may be employed. Where a complete removal of all traces of the antimony trichloride from the alkylated products is desirable, one suitable procedure is to wash the separated organic layer with one or more portions of aqueous hydrochloric acid. The antimony trichloride thus extracted may then be readily isolated for further use by the evaporation of the hydrochloric acid.

Among the various suitable alternative procedures for the recovery of the antimony trichloride, which will be readily apparent to the man skilled in the art, are the following: allowing the solution of the reaction products to cool and stratify and washing the decanted organic layer with aqueous hydrochloric acid without the addition of a non-ionic solvent; separating the main portion of the antimony trichloride in a similar fashion and treating the organic layer with water to hydrolyze the antimony trichloride to the oxychloride which may readily be removed by filtration; the addition of a non-ionic organic solvent to the warm reaction mixture immediately following the completion alkylation reaction; fractionally distilling the mixture to separate the products, solvent and antimony trichloride without the step of cooling to cause stratification of the solution; and similar procedures.

The alkylation is most preferably carried out at a temperature at which substantially all of the components of the reaction medium are in the liquid state or are dissolved in the liquid catalyst. In this manner a substantially homogenous liquid phase solution is obtained which results in the optimum activity of the catalyst. Particularly suitable alkylations have been obtained employing the preferred catalysts at temperatures between about 80° C. and 110° C.; however, the alkylation temperature may suitably vary between about 50° C. and about 250° C. The process is generally rapid and productive of good yields when the reaction components are treated under normal atmospheric pressure, but substantially greater or lower than atmospheric pressures may suitably be employed. For example, whenever one or more of the components has a sufficiently low boiling temperature to cause the reaction mixture to boil violently at below the desired reaction temperature, the desired temperature can suitably be attained by the application of greater than atmospheric pressure. In certain cases it may be desirable to operate under conditions of reflux and pressures substantially below atmospheric may suitably be employed as required to obtain a reflux at a convenient temperature, or in view of other consideration The process is applicable to mixtures of either th aromatic compound or the alkylating agent i. suitable diluents, but the optimum results are obtained when substantially pure or highly concentrated mixtures of the reactants are employed. Inert diluents or solvents such as the nitro-paraffins, and the like may be employed whenever their use is practical or desirable. In the absence of catalyst activators the process may be conducted in any suitable apparatus constructed of any of the commonly employed metal or ceramic materials. However, when hydrogen chloride is employed, contamination of the products is avoided by conducting the process in enameled or other acid resistant equipment.

The molar ratios of the aromatic compound to the alkylating agent may be varied over wide limits, thereby controlling to a certain extent the degree of alkylation obtained in the principal reaction product. However, in any case, monoalkylated compounds generally cannot be prepared in the absence of polyalkylated products. The alkylation reaction is usually accompanied by a certain amount of polymerization of alkylating agent, depending primarily upon the procedure and rate of introduction of the alkylating agent into the reaction mixture, and the reaction temperature. For example, if it is desirable to cause the maximum condensation of the monomeric alkylating agent with the aromatic compound, the alkylating agent is preferably introduced slowly into the reaction mixture at a reaction temperature of between about 90° C. and 125° C. On the other hand, where polymeric substances and aromatic compounds alkylated by polymeric molecules of the alkylating agent are desired the desired amount of alkylating agent should be entirely introduced before the mixture is brought to the reaction temperature, or the aromatic compound should be slowly added to the alkylating agent and catalyst at the desired temperature, the polymerization reaction being generally favored by temperatures below about 95° C.

In one of its most important applications the process provides an improved method of preparing lubricating oils, lubricating oil additives, washing agents, siccatives, and the like.

In the preparation of lubricating oils or lubricating oil additives it is preferable to employ the alkylating agent in an excess of the stoichiometric amount required for the total number of alkylating places in the aromatic compounds. When hydroxyl and carboxyl substituted aromatic compounds such as salicylic acid, etc., are alkylated by the present process with an excess of olefines containing from 6 to 20 carbon atoms per molecule, alkylation and polymerization products are produced which are exceptionally effective lubricating oils. In addition, the alkylation and polymerization products so obtained, form improved metal salt-containing lubricants or metal salt-containing lubricant additives upon treatment with a polyvalent metal. Such lubricant additives increase the stability to oxidation or decomposition at high temperatures, promote the cleanness of the cylinders in combustion engines, counteract the deposition of carbonaceous products on the pistons and in the piston ring grooves and restrict the general wear and tear due to corrosion.

The following examples are presented to illustrate typical applications of the new process:

*Example I*

A solution of salicylic acid in antimony trichloride was prepared by dissolving 100 g. of salicylic acid in 625 g. of molten antimony trichloride at about 90° C. in a reactor connected to a reflux condenser. The solution was stirred continuously and 400 g. of cetene was introduced at a rate which did not cause the temperature of the solution to rise about 95° C. The reaction mixture was then maintained, with constant stirring, for a period of about 4 hours at a temperature of from 90 to 95° C. By the end of this period the reaction was substantially completed and the solution was allowed to cool below the melting point of the antimony trichloride. The greater portion of the antimony trichloride crystallized and the liquid organic layer was separated by decantation in the form of a somewhat oily liquid containing a small amount of antimony trichloride. Water was added to this organic solution, and the solution was stirred until the dissolved antimony trichloride was converted to a white precipitate of antimony oxy-chloride which was removed by filtration. The organic filtrate was washed with portions of hot water until the washings no longer formed a color reaction with ferric chloride, i. e., no longer contained unreacted salicylic acid.

By a steam distillation, substantially all of the unconverted cetene was removed from the washed oily reaction products. The dried residue from the distillation which was a dark-colored liquid having pronounced oily characteristics was obtained in a yield of 408 grams corresponding to a conversion of 82% of the total weight of the starting materials to the desired products.

*Example II*

A liquid mixture of 250 g. phosphorus trichloride and 50 g. of salicylic acid dissolved in 200 g. of cetene was heated to a temperature of from 90 to 100° C. In a short time a clear light yellow solution was formed which was then maintained at between 90 and 100° C. for 5 hours with constant stirring. At the end of this period the phosphorus trichloride was removed from the solution by distilling the solution in a stream of dry nitrogen gas. The organic residue was dilute with an approximately equal volume of iso-octane and worked with portions of hot water until the washings were free of unconverted salicylic acid and hydrochloric acid.

By a distillation with superheated steam at 150° C., substantially all of the iso-octane and the unreacted cetene were removed from the washed organic reaction products. The dried residue had a pronounced oily character and was obtained in a yield of 43 grams.

*Example III*

A substantially homogeneous liquid phase reaction mixture was prepared by warming a mixture of 500 g. arsenic trichloride, 50 g. of salicylic acid, and 200 g. of cetene to a temperature of between 90 and 100° C. The heating was then continued with constant stirring to maintain the temperature between 90 and 100° C. for a period of 5 hours. At the completion of the reaction period a substantial excess of water was introduced to convert all of the arsenic trichloride to arsenious acid, which was then removed by filtration. The organic filtrate was then washed with portions of hot water until the washings no longer contained unreacted salicylic acid. By removing the unconverted cetene with steam at 150° C. 37 grams of dry reaction products were obtained.

*Example IV*

A substantially homogeneous liquid phase reaction mixture was prepared by warming a mixture of 32 g. of naphthalene, 112 g. of cetene, and 115 g. of antimony trichloride, plus 4% based on the weight of antimony trichloride of aqueous ferric chloride. The heating was then continued with constant stirring to maintain a temperature of approximately 90° C. for 4 hours. At the end of this period the reaction mixture was cooled and the separated organic layer washed with portions of aqueous hydrochloric acid until all of the antimony and ferric chlorides were removed. The salt-free organic reaction products were then washed free of hydrochloric acid by portions of hot water and subjected to a distillation with steam at 250° C. A yield of 87 g. of dry oily alkylation and polymerization products were obtained, which corresponds to the conversion of over 61% of the total weight of starting materials to the desired products.

Example V

A homogeneous solution was prepared by heating a mixture of 45 g. of antimony trichloride and 5 g. of phenol to 100° C. To the constantly stirred solution 30 g. of an olefine fraction containing from 5 to 8 carbon atoms per molecule was added drop by drop. When the addition of the olefine was complete, hydrogen chloride gas was introduced for 2½ hours and the stirring of the reaction mixture at a temperature of approximately 100° C. continued for about one additional hour. The reaction mixture consisting of a homogeneous red liquid was diluted with water and subjected to steam distillation. The aqueous distillate was found to form no characteristic color of a phenol when tested with ferric chloride which indicated the complete conversion of the phenolic starting materials to phenyl ethers.

It will be readily apparent to the man skilled in the art that in each of the above examples the yield of the converted product can readily be increased by recovering and reemploying the unconverted reactants. For example, in the alkylation of salicylic acid by cetene, the unreacted cetene as well as the unreacted salicylic acid are separated in the form of dilute water solutions, or suspensions from which they may readily be isolated by well-known procedures, such as the neutralizing and concentration of the acid solution and/or salting out of the organic materials.

The invention claimed is:

1. A method of alkylating salicylic acid with cetene, which comprises introducing substantially 2.5 moles of cetene per mole of salicylic acid into a mixture of salicylic acid and six times its weight of antimony trichloride, at a temperature of from 90° C. to 100° C.

2. A process for the alkylation of salicylic acid with olefins, which comprises reacting, at a temperature of from 50° C. to 250° C., at least one normally liquid olefin with salicylic acid mixed with at least 3.5 times its weight of antimony trichloride in the presence of a catalyst activator consisting of hydrogen chloride.

3. A process for the alkylation of salicylic acid with olefins, which comprises reacting, at a temperature of from 50° C. to 250° C., at least one normally liquid olefin with salicylic acid mixed with at least 3.5 times its weight of antimony trichloride.

4. A process for the alkylation of an alkylatable hydroxyaromatic carboxylic acid with olefins, which comprises reacting, at a temperature of from 50° C. to 250° C., at least one normally liquid olefin with an alkylatable hydroxyaromatic monocyclic carboxylic acid mixed with at least 3.5 times its weight of antimony trichloride.

5. A process for alkylating a polar aromatic compound having attached to the aromatic nucleus at least one replaceable hydrogen atom and a polar substituent of the group consisting of hydroxyl and carboxyl radicals which comprises reacting, at a temperature of from 50° to 250° C., at least one normally liquid olefin with said polar aromatic compound mixed with at least 3.5 times its weight of antimony trichloride.

6. A process according to claim 5 wherein the catalyst is recovered by cooling the reaction mixture to crystallize antimony trichloride therefrom, separating the crystallized antimony trichloride from the reaction product and extracting further antimony trichloride from the latter.

HARCO JACOB TADEMA.

REFERENCES CITED

The following references are of record in the file of this patent:

UNITED STATES PATENTS

| Number | Name | Date |
|---|---|---|
| 2,061,593 | Robinson | Nov. 24, 1936 |
| 2,252,662 | Reiff | Aug. 12, 1941 |
| 2,253,811 | Reiff | Aug. 26, 1941 |
| 2,353,053 | Lieber | July 4, 1944 |
| 2,360,699 | McAllister et al. | Oct. 17, 1944 |
| 2,370,195 | Ross et al. | Feb. 27, 1945 |
| 2,411,578 | Lieber | Nov. 26, 1946 |

OTHER REFERENCES

Thomas: "Anhyd. Aluminum Chloride in Org. Chem.," ACS Monograph #87, Reinhold, pp. 466–467 (1941).

Adams et al.: "Org. Reactions" (Wiley, 1946), vol. 3, pp. 1–3.